April 27, 1954   J. S. PANOSIAN   2,676,901
METHOD OF MANUFACTURING A PHOTOGRAPHIC FILM HOLDER
Filed July 11, 1950   3 Sheets-Sheet 1
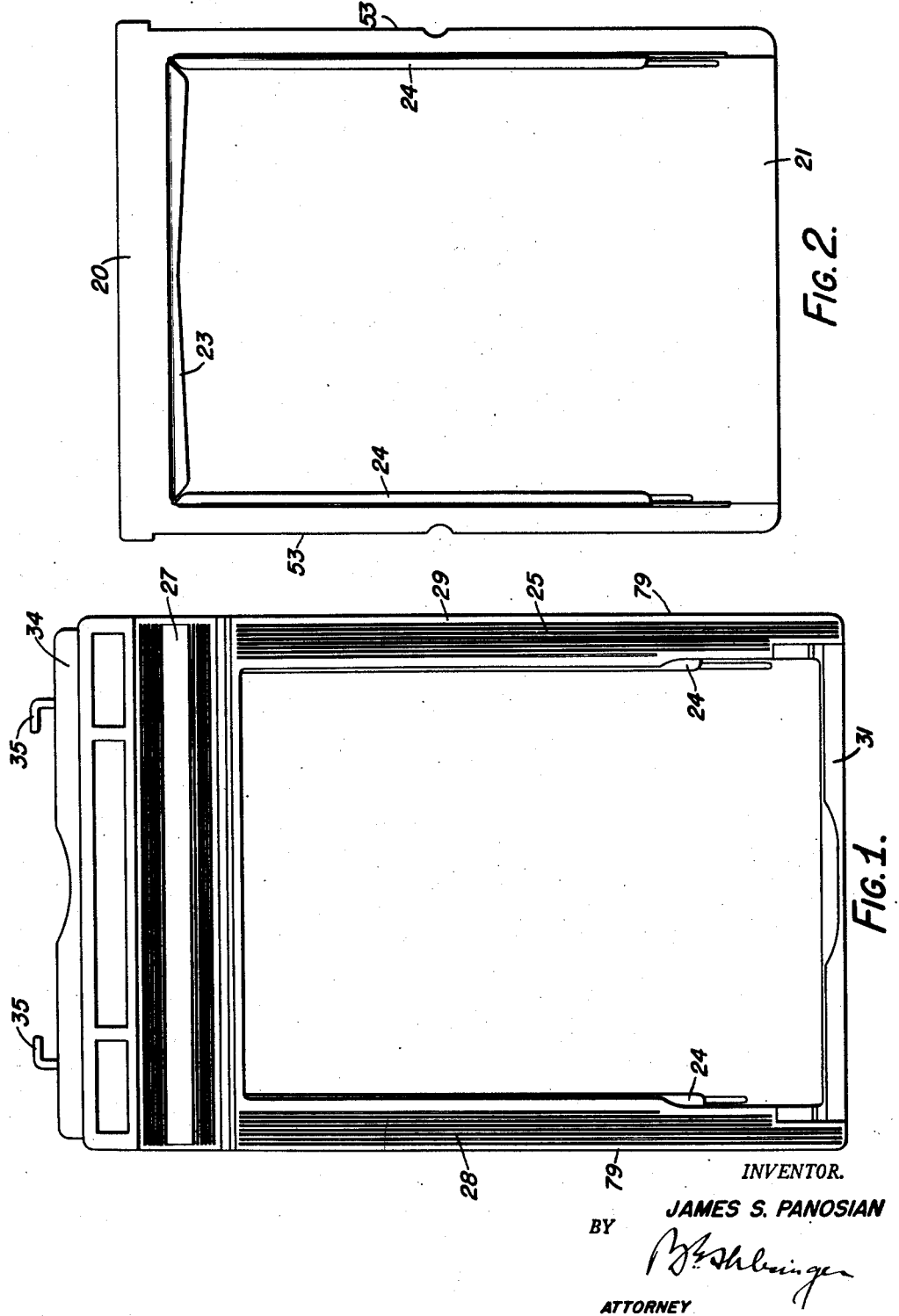
INVENTOR.
JAMES S. PANOSIAN
BY
ATTORNEY

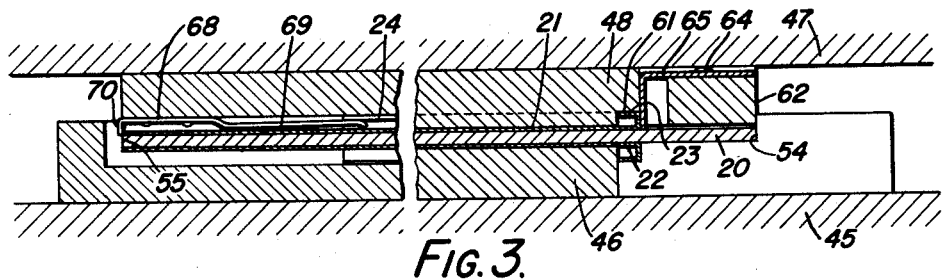
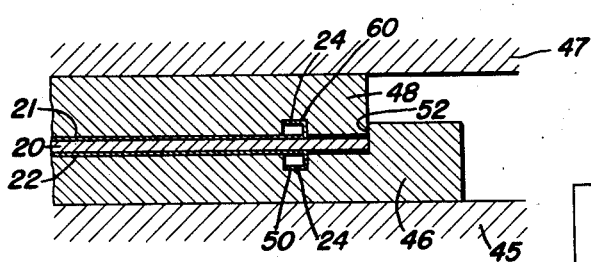
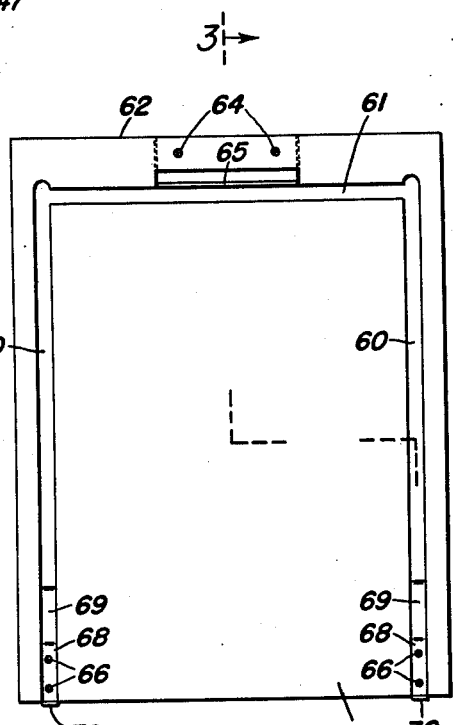
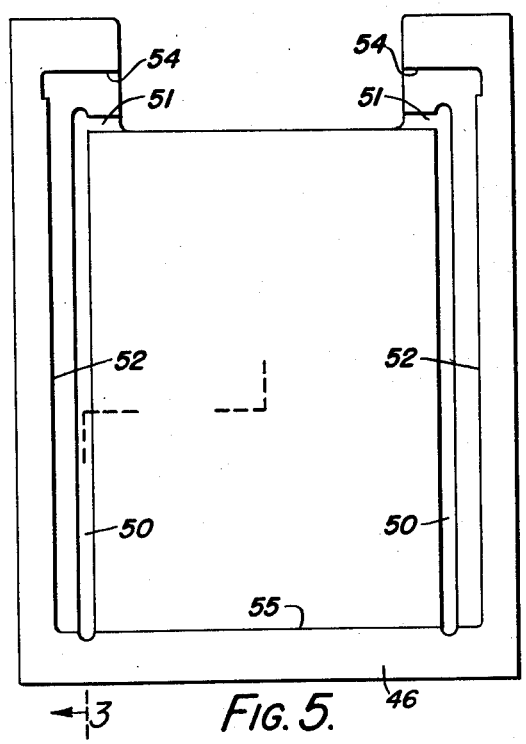

April 27, 1954     J. S. PANOSIAN     2,676,901

METHOD OF MANUFACTURING A PHOTOGRAPHIC FILM HOLDER

Filed July 11, 1950     3 Sheets-Sheet 3

INVENTOR.
JAMES S. PANOSIAN
BY
ATTORNEY

Patented Apr. 27, 1954

2,676,901

UNITED STATES PATENT OFFICE 2,676,901

METHOD OF MANUFACTURING A PHOTOGRAPHIC FILM HOLDER

James S. Panosian, Rochester, N. Y., assignor to Graflex, Inc., Rochester, N. Y., a corporation of Delaware Application July 11, 1950, Serial No. 173,151

6 Claims. (Cl. 154—118)

1

The present invention relates to the manufacture of removable film holders for photographic cameras and more particularly to the manufacture of film holders which have plastic frames. In a still more specific aspect, the invention relates to the manufacture of a photographic film holder of the type disclosed in my U. S. Patent No. 2,497,270, granted February 14, 1950.

A removable photographic film holder must be made precisely so as to position the film, when the holder is in the camera, exactly in the focal plane of the camera. Otherwise, it will be impossible to obtain the sharp definition that is desirable in taking pictures.

Plastics offer a desirable medium from which to make the frame and other parts of a removable photographic film holder because by using plastics, the film holder can be made light in weight, easier to handle, and cheaper. Heretofore, however, there has been no commercially practical way of making a film holder with a plastic frame in such way as to hold its dimensions precisely enough for use in a photographic camera. The front and rear surfaces of the film holder determine the position of the film in the camera and unless these surfaces are precisely spaced from one another and from the septums which carry the film, the film will not be in the focal plane of the camera when the holder is in the camera.

A primary object of the present invention is to provide a method of manufacturing a removable photographic film holder having a plastic frame through which the septums, which hold the film, can be precisely positioned in the frame. To this end, it is a further object of the invention to provide a method for manufacturing a removable photographic film holder with a plastic frame in which the lateral (front and rear) faces of the frame may be spaced predetermined distances from corresponding faces of a separator plate which is mounted within the frame and which carries the septums on its opposite sides.

Another object of the invention is to provide a method for manufacturing photographic film holders with plastic frames which will require a minimum of equipment, be fast, and be simple to perform.

Still another object of the invention is to provide a method for manufacturing photographic film holders with plastic frames which may be performed in a conventional press.

A still further object of the invention is to provide a suitable die for use in the process of the present invention.

Other objects of the invention will be apparent hereinafter from the specification and from the recital of the appended claims.

In the drawings:

Fig. 1 is a front view of a film holder such as may be made by the method of the present invention, the film holder being shown stripped of its dark slides and stripped of its bottom flaps;

Fig. 2 is a front view of the separator plate and one of the septums of this film holder;

Figure 7:
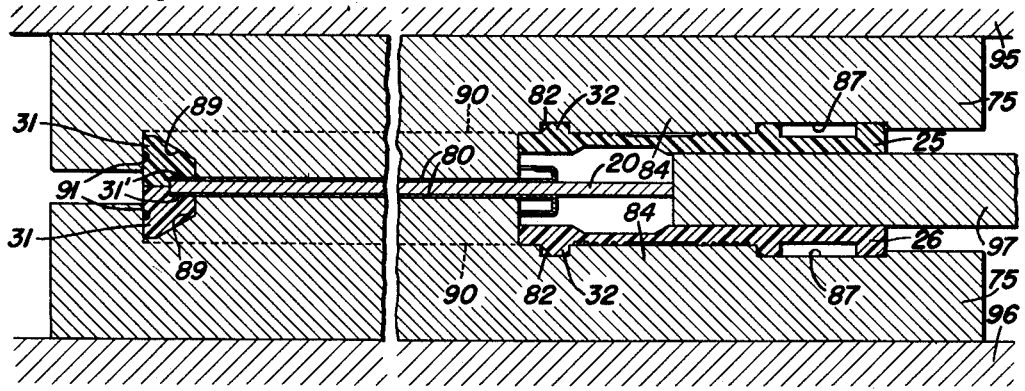
Figure 8:
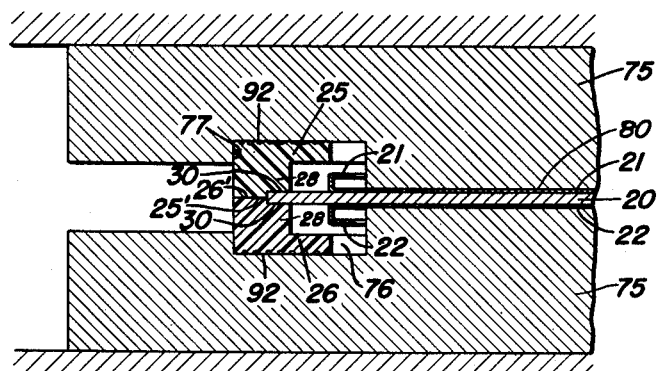
Figure 9:
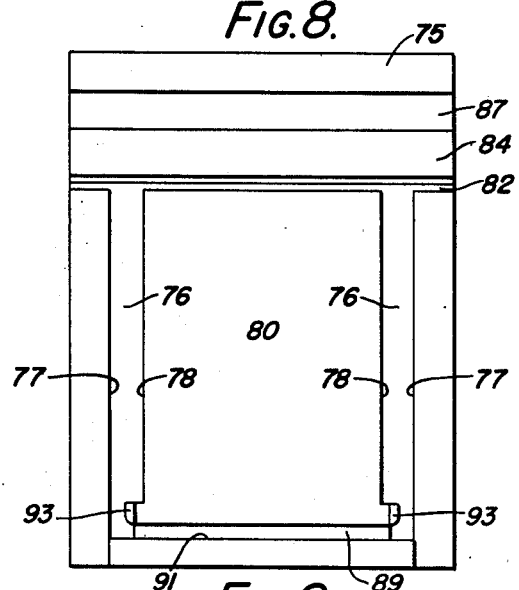

Fig. 3 is a fragmentary longitudinal sectional view showing one step in the manufacture of the film holder, namely, the step of securing the septums to opposite sides of the separator plate, the upper and lower dies, which serve to press the septums into engagement with the separator plate, being shown in operative position, the sections through the lower and upper dies being taken, respectively, on the lines 3—3 of Figs. 5 and 6;

Fig. 4 is a fragmentary section further illustrating this step in manufacture and taken at right angles to Fig. 3;

Figs. 5 and 6 are, respectively, elevational views of the lower and upper dies used in the operation of securing the septums to the separator plate;

Fig. 7 is a fragmentary longitudinal section illustrating the step of fastening the separator plate in the plastic frame;

Fig. 8 is a fragmentary transverse section taken at right angles to Fig. 7, further illustrating this step in the process;

Fig. 9 is a view of one of the dies used in this step; and

Figure 10:
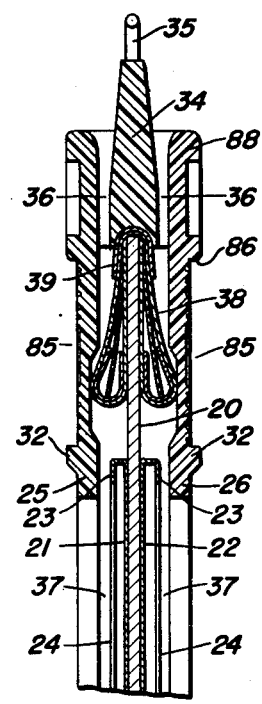

Fig. 10 is a fragmentary longitudinal section of the completed film holder, without its dark slides.

In the drawings, there is shown one form of film-holder which may be manufactured by the method of the present invention. This film holder is of the type disclosed in my Patent No. 2,497,270 and for a better understanding of the present invention, the structure of this holder will first be described so far as is necessary to an understanding of this invention.

20 (Figs. 2 and 10) denotes the separator plate of the film holder and 21 and 22 are the septums which are secured to opposite sides of this plate. Each septum, as shown in the case of the septum 21 of Fig. 2, has a curled-over end 23 and curled-over sides 24 for holding a sheet of film or other sensitized material.

The separator plate 20 is mounted in a frame comprising front and rear portions 25 and 26 (Figs. 1 and 10), respectively. Each frame piece is open-faced and comprises the top portion 27, the parallel side rails 28 and 29, and the bottom cross-piece 31. In the completed film holder the bottom flaps (not shown) are secured to the cross-pieces 31. The opposed faces of the side rails 28 and 29 of the two frame members 25 and 26 are recessed, as denoted at 30 in Fig. 8, and the opposed faces of the cross rails 31 are recessed, as denoted at 31' in Fig. 7 to receive the separator plate 20.

Each of the frame portions 25 and 26 is formed on its outside surface with a key 32 (Fig. 10) which serves to retain the holder in the camera and provide a light lock between the holder and the camera. Two dark slides are adapted to be mounted between the two septums 21 and 22 and the frame members 25 and 26. These are shown in my Patent No. 2,497,270, but are omitted from the present drawings for the purpose of clearness. Also mounted in the film holder is a cross member 34 which forms a guide for the dark slides. The dark slides are adapted to be disposed in the spaces 36 between the cross member 34 and the frame parts 25 and 26 and in the spaces 37 between the septums 21 and 22 and the frame parts 25 and 26. Hooks 35 (Figs. 1 and 10) are threaded into this cross member and are pivotal therein to lock the dark slides in the holder. The cross member 34 also acts as a retaining member for a light valve or seal 38 which is attached to the upper end of the separator plate 20 and which is secured thereto by a U-shaped clip 39. This light valve or seal 38 may be of the construction described in my above-mentioned patent.

To manufacture the film holder described, the septums 21 and 22 are first cemented to opposite sides of the separator plate 20. For this purpose, any suitable form of press may be used having a base portion 45 (Fig. 3) carrying a lower die 46, and an upper portion or ram 47 carrying an upper die 48. The lower die 46 (Fig. 5) has two parallel longitudinal grooves 50 provided in its upper face to receive the folded over portions 24 of one septum 22; and it also has transverse grooves 51 in its upper face to receive the folded over portion 23 of this septum. It is provided with longitudinal shoulders 52 (Figs. 4 and 5) parallel to the grooves 50 against which the side surfaces 53 (Fig. 2) of the separator plate 20 abut. It is formed with transverse shoulders 54 (Figs. 5 and 3) parallel to its grooves 51 against which the top of the separator plate 20 abuts. It is also provided with a transverse shoulder 55 against which the bottom of the separator plate 20 abuts.

The upper die 48 (Fig. 6) is provided with longitudinal grooves 60 parallel to its long sides to receive (Fig. 4) the turned over portions 24 of the septum 21; and it is provided with a transverse groove 61 parallel to its top side in which the turned over portion 23 of the septum 21 may seat. When the two dies are in operative position the top surface 62 of the die 48 is adapted to abut against the shoulder 54 of the lower die 46.

Riveted to the upper die 48 by rivets 64 is a right angular stop member 65 which serves as a stop against which the turned over portion 23 of the septum 21 may abut. Riveted in the recesses or grooves 60 of the upper die 48 by rivets 66 are spring clips 68 which have fingers 69 adapted to engage in the turned over portions 24 of the septum 21. These clips 68 also have down-turned portions 70 against which the lower end of the septum 21 may abut. The spring clips 68 and stop 65 therefore serve to hold and center the septum 21 while the upper die 48 is being lowered to carry the septum 21 down onto the separator plate 21.

The septum 22 is first positioned in the lower die 46 so that its turned over portion 23 fits into the grooves 51 of this die and its turned over portion 24 fits into the grooves 50 of this die. Then a pressure cement is applied to the back of the septum; and the separator plate 20 is placed thereon with its top abutting against the shoulder 54 of the lower die 46, its bottom abutting against the shoulder 55 of this die, and its sides 53 abutting against the shoulders 52 of this die. Then a pressure sensitive cement is sprayed either on the upper face of the separator or on the back of the other septum 21. Then the other septum 21 is placed in the upper die 48 with its turned over portion 24 abutting against the stop 65 of the upper die and engaging in the groove 61 of this die, with its turned over portions 23 engaged by the spring fingers 69 of clips 68 and seating in the grooves 60 of this die, and with bottom seating against the bent portions 70 of the spring clips 68. Then the upper part of the press or ram 47 is brought down and pressure is applied to cause the cement to set and rigidly secure the septum plates to the separator plate 20. This pressure is transmitted from one die to the other through the three pieces 21, 20, 22, and the pressure will be uniform over the entire septum surfaces regardless of tolerance build-up of the three pieces which are being cemented together.

The operation of cementing the septums to the separator plate is preferably a hot operation, performed, with electrically or steam-heated dies or other suitable heating means, pressure being applied uniformly over the entire septum surfaces, and the ram 47 being held in engagement with the septums for say sixty seconds at say five thousand pounds total platen pressure at say 275° F. The dies 46 and 48 are made, of course, with smooth engaging surfaces so as not to mar the surfaces of the septum.

We now have a metallic separator plate 20 with metallic septum plates 21 and 22 fastened to opposite sides thereof. The next step is to secure the frame parts 25 and 26 to the separator plate. For this purpose, two identical dies are provided such as illustrated at 75 in Fig. 9.

Each of the dies 75 (Fig. 9) has parallel longitudinal recesses or grooves 76 in one face parallel to its sides which are adapted to receive the side portions 28 and 29 of a frame member 25 or 26, and they have shoulders 77 and 78 bounding each of these grooves. Each groove 76 is of sufficient width to receive the turned over portions 24 of a septum and the side 28 or 29 of a frame piece 25 or 26. The side surfaces 79 (Fig. 1) of the frame members are adapted to seat against the shoulders 77 (Fig. 8) of the two dies. The portion of each die between the grooves 76 projects laterally beyond the rest of the die and its face 80 constitutes a surface adapted to engage one of the septums.

Each of the dies has a transverse groove 82 (Fig. 9) in it shaped to receive the key portion 32 of one of the frame members and each die has a portion 84 which is adapted to enter the recess 85 in each frame piece between the key 32 and the shoulder 86 (Fig. 10) of the frame piece. Each die is further formed with a recessed portion 87 to receive the upper transverse portion 88 of a frame member.

Each of the dies also has a transverse recess or groove 89 (Fig. 9) near its foot which has an inclined bottom to receive the inclined cross-rail 31 of a frame piece as shown in Fig. 7. The shoulder 91 formed by this groove 89 serves as a seat for the bottom of the frame piece. The lugs 93 (Fig. 9) formed on the raised central portion 80 of each die at the sides of grooves 76 serve as seats engaging the inside surfaces of the rails 23 and 29 of a frame piece.

In the preferred method of manufacture rigid, previously-cured and stabilized plastic frame-pieces are assembled to the separator plate, these frame-pieces being made plastic at their opposed surfaces only and being pressed together to mold them together through these surfaces. Where the frame pieces are molded directly to the separator plate, shrinkage of the plastic may occur during curing with the result that accuracy of thickness of the film holders cannot be maintained. Where the frame pieces are, however, first molded and cured, and then their opposed surfaces only are rendered plastic, and then the frame pieces are pressed together about the separator plate, the thickness of the completed film holder can be held very accurately. The rigid, previously-cured, stabilized plastic frame pieces are wetted with a solvent or heated at their opposed surfaces for a depth which will permit offsetting non-uniformity in thickness of the molded, cured frame-pieces, and when the frame-pieces are pressed together, excess plastic will be squeezed away from between the opposed surfaces of the frame pieces, thus making the desired uniformity of thickness of the film holders attainable.

In assembling the separator plate and frame members, then, a rigid, previously-cured, stabilized frame piece 26 is placed on the lower die with its key 32 in the recess 82 of this die, with the portion 84 of the die fitting into the recess 85 of the frame piece, with the outsides of the side rails 28 and 29 of the frame piece abutting against the shoulders 77 of the die, and the insides of the side rails 28 and 29 abutting against the lugs 93, and with the cross rail 31 in groove 89. Then the separator plate, which now carries the septums 21 and 22, is placed on this frame piece. The other rigid, previously-cured and stabilized frame piece 25 is then placed on the separator plate after say first wetting the contacting surfaces 25' and 26' (Fig. 8) of the two frame members with a solvent. The lower die is mounted on the anvil or base of a conventional press. The upper die member 75, which is secured to the ram 95 of the press, is then brought down so that its raised portion or projection 80 enters the central opening in the face of the frame piece 25 and engages the upper septum 21, and so that its grooves 76, 82, 87, 89 receive the various portions of the frame piece 25 similar to the manner in which the lower die receives its frame piece.

The face of each of the projections 80 is offset a predetermined distance from the plane 90 (Fig. 7) of the faces of the parts 84 and 87 of each die. Since the projections of the upper and lower dies engage the metallic, unyielding septums 21 and 22 secured to the separator plate 20, the distance between the die surfaces lying in the planes 90 is a predetermined distance when the projections 80 have metal to metal contact with the septums. The engagement of the projections 80 of the dies with the septums stop the pressing operation, and the thickness of the completed frame comprising parts 25 and 26 is determined therefore not by pressure on yielding plastic parts but by the precise dimensions of the dies which can be made accurately so the plane face of each projection 80 is offset laterally a precise distance from the parallel basic plane 90 of the die. Thus the front and rear faces of the frame will be spaced apart a distance equal to the distance between the two planes 90 (Fig. 7), that is, to twice the amount of the offset of each projection 80 from its plane 90 plus the thickness of the separator plate 20 and of the two septums 21 and 22.

In the embodiment shown the faces of projections 80 are offset .197 inch from their respective planes 90, and the separator plate and the two septums have a combined thickness of .071 inch. Hence the distance between the front and rear faces of the completed frame is .465 inch. Thus, the required distance between the front and rear faces of the frame members and the septums will be precisely held so that when the film holder is mounted in the camera, the film will lie in the focal plane of the camera. It is this holding by metal-to-metal contact that gives the precise control which is the object of the present invention. The keys 32 and top rails 88 of the frame project, of course, beyond the front and rear faces of the frame.

A block 97 may be positioned, as shown in Fig. 7, between the upper cross rails 88 of the frame pieces during the operation of joining of the frame-pieces to preserve the space for holder 34 (Fig. 10) and the light-seal 38.

The bead which is squeezed from the two frame pieces along the sides thereof in the pressing operation is trimmed off after the plastic members have set and have been removed from the die.

While the invention has been described in connection with the manufacture of a particular type film holder, it will be understood that it may be used in the manufacture of other film holders having plastic frames and rigid separator plates. It will be understood, therefore, that while the invention has been described in connection with a specific embodiment thereof and a particular use therefor, the invention is capable of further modifications, and uses, and this application is intended to cover any embodiments, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of manufacturing a photographic film holder which has a rigid separator plate mounted in a plastic frame, said separator plate being adapted to carry sensitized sheets on its opposite sides and said frame projecting laterally at opposite sides from the opposite sides of the plate, which comprises placing the plate upon a plastic frame piece whose thickness is slightly more than half that of the finished frame, then placing a second plastic frame piece, whose thickness also is slightly more than half that of the finished frame, over the plate with the opposed lateral faces of the two frame pieces in contact and in a plastic state, positioning the two frame pieces between dies and pressing the dies toward one another until the dies engage the separator plate, to secure the frame pieces together around said plate, and to space the outside lateral faces of the frame at precise distances, respectively, from sensitized sheets which are carried by said plate.

2. The method of manufacturing a photographic film holder which has a rigid separator plate for carrying sensitized sheets mounted in a frame which is open-faced on both lateral sides of the plate, which comprises placing the plate between two open-faced plastic frame-pieces, with the opposed lateral faces of the frame-pieces in contact, positioning the frame pieces between two dies, each of which has a raised portion that projects from the rest of its working face and that is adapted to enter through the open face of the frame-piece, and pressing the two dies toward one another, while the opposed lateral faces of the two frame-pieces are in a plastic state, until the raised portions of the working surfaces of the two dies engage the plate.

3. The method of manufacturing a photographic film holder which has a rigid metallic separator plate for carrying sensitized sheets mounted in a frame which is open-faced at both lateral sides of the plate, which comprises first cementing metallic film-holding septums to opposite sides of the separator plate, then placing the plate with the septums attached to it between two open-faced plastic frame-pieces, with the opposed lateral faces of the frame-pieces in contact, positioning the frame pieces between two dies, each of which has a raised portion that projects from the rest of its working face and that is adapted to enter through the open face of a frame-piece, and pressing the two dies toward one another, while the opposed lateral faces of the two frame-pieces are in a plastic state, until the raised portions of the working surfaces of the two dies engage the septums which are cemented at opposite sides to the separator plate.

4. The method of manufacturing a photographic film holder which has a rigid plate for holding a sensitized sheet that is supported in a plastic frame, which comprises placing the plate upon a previously-cured and stabilized plastic frame piece, then placing a second previously-cured and stabilized plastic frame-piece over the plate with the opposed lateral faces of the two frame-pieces in contact and in a plastic state, pressing the two frame pieces toward one another between dies, and stopping the movement of the dies toward one another when the outside lateral face of one frame piece is at a precise distance from one lateral face of the plate, thereby to space said outside lateral face a precise distance from a sensitized sheet which is held on said plate.

5. The method of manufacturing a photographic film holder which has a rigid separator plate for carrying sensitized sheets mounted in a frame which is open-faced at both lateral sides of the plate, which comprises placing the plate between two open-faced, previously-cured and stabilized plastic frame-pieces, each of which is of slightly greater thickness than half the finished thickness of the frame, with the opposed lateral faces of the frame-pieces in contact, engaging the outside lateral face of each frame-piece with a die, that has a raised portion projecting beyond the rest of its working face, in such wise that the raised portion of the working surface of the die enters through the open face of the associated frame-piece, and pressing the two dies toward one another, while the opposed lateral faces of the two frame-pieces are in a plastic state, until the raised portions of the working surfaces of the two dies engage the plate.

6. The method of manufacturing a photographic film holder which has a rigid separator plate for carrying sensitized sheets mounted in an apertured, open-faced plastic frame, which comprises placing the plate upon a plastic frame piece, placing a second, apertured frame piece over the plate, positioning the frame pieces between dies, one of which has a raised portion projecting beyond the rest of its working face, so that said raised portion of said one die enters the aperture in said second frame piece and so that the rest of the working face of said one die will engage the side face of the second frame piece about said aperture, and pressing the dies against the frame pieces, while the opposed lateral faces of the frame pieces are in engagement and in a plastic state and until said one die is stopped by engagement of its raised portion with said plate.

References Cited in the file of this patent

UNITED STATES PATENTS

| Number | Name | Date |
| --- | --- | --- |
| 1,209,358 | Terklelsen | Dec. 19, 1916 |
| 1,244,676 | Wilcox | Oct. 30, 1917 |
| 1,308,330 | Brown | July 1, 1919 |
| 1,565,532 | Tupper | Dec. 15, 1925 |
| 1,910,526 | Dempsey | May 23, 1933 |
| 2,344,951 | Smith | Mar. 28, 1944 |
| 2,450,841 | Moore | Oct. 5, 1948 |
| 2,497,270 | Panosian | Feb. 14, 1950 |